US011157554B2

(12) United States Patent
Gan et al.

(10) Patent No.: US 11,157,554 B2
(45) Date of Patent: Oct. 26, 2021

(54) VIDEO RESPONSE GENERATION AND MODIFICATION

(71) Applicant: INTERNATIONAL BUSINESS MACHINES CORPORATION, Armonk, NY (US)

(72) Inventors: Chuang Gan, Cambridge, MA (US); Abhishek Bhandwaldar, Somerville, MA (US); Yang Zhang, Cambridge, MA (US); Xiaoxiao Guo, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 16/674,402

(22) Filed: Nov. 5, 2019

(65) Prior Publication Data

US 2021/0133236 A1    May 6, 2021

(51) Int. Cl.
*G06F 16/30* (2019.01)
*G06F 16/73* (2019.01)
*G06N 20/00* (2019.01)
*G06F 16/783* (2019.01)
*G06F 16/901* (2019.01)
*G06F 16/242* (2019.01)

(52) U.S. Cl.
CPC ............ *G06F 16/73* (2019.01); *G06F 16/243* (2019.01); *G06F 16/7834* (2019.01); *G06F 16/9024* (2019.01); *G06N 20/00* (2019.01)

(58) Field of Classification Search
CPC .... G06F 16/73; G06F 16/243; G06F 16/7834; G06F 16/9024; G06N 20/00
See application file for complete search history.

(56) References Cited

U.S. PATENT DOCUMENTS 8,370,869 B2    2/2013    Paek
8,886,011 B2    11/2014   Chou
9,965,705 B2    5/2018    Chen
(Continued)

OTHER PUBLICATIONS

Article entitled "Video Based Contextual Q&A", by Ganesan et al., dated Apr. 19, 2018 (Year: 2018).*

(Continued)

*Primary Examiner* — Mahesh H Dwivedi
(74) *Attorney, Agent, or Firm* — Schmeiser, Olsen & Watts; Stosch Sabo

(57) ABSTRACT

A method, system, and program product for generating and modifying a video response is provided. The method includes receiving an audio/video file. Parsed video features of the audio/video file are generated with respect to a first graph. Parsed audio features of the audio/video file are generated with respect to a second graph. The first graph is placed overlaying the second graph and at least one intersection point between the first graph and the second graph is determined. A natural language query is executed with respect to the audio/video file and a parsed query entity is generated from the natural language query. The parsed query entity is analyzed with respect to the intersection point and a node of the intersection point comprising similar features is determined with respect to the parsed query entity. A resulting natural language response with respect to the natural language query is generated.

20 Claims, 7 Drawing Sheets

(56) References Cited

U.S. PATENT DOCUMENTS

| | | | |
|---|---|---|---|
| 10,198,637 B2 | 2/2019 | Tran | |
| 10,327,043 B2 | 6/2019 | Venkatraman | |
| 10,339,824 B2 | 7/2019 | Srinivasan Natesan | |
| 2016/0065880 A1 | 3/2016 | Pearson | |
| 2016/0351065 A1 | 12/2016 | Sinnickson | |
| 2018/0210890 A1 | 7/2018 | Son | |
| 2018/0349368 A1 | 12/2018 | Bellingham | |
| 2019/0095806 A1 | 3/2019 | Martinez Canedo | |
| 2019/0122667 A1 | 4/2019 | Andersen | |
| 2020/0218510 A1* | 7/2020 | Clower | G06F 3/167 |
| 2020/0402537 A1* | 12/2020 | Sun | H04N 21/8456 |
| 2021/0012222 A1* | 1/2021 | Kim | G06K 9/00744 |
| 2021/0050000 A1* | 2/2021 | Danilo | G06F 40/30 |
| 2021/0082398 A1* | 3/2021 | Hori | G10L 15/063 |

OTHER PUBLICATIONS

Article entitled "Location-Aware Graph Convolutional Networks for Video Question Answering", by Huang et al., Copyright 2020 (Year: 2020).*

Attention in VQA and Question-Focused Semantic Segmentation, by Gan et al., dated 2018 (Year: 2018).*

Lei, Jie et al.; TVQA: Localized, Compositional Video Question Answering2018 Conference on Empirical Methods in Natural Language Processing; Oct.-Nov. 2018; pp. 1369-1379.

Na, Seii et al.; A Read-Write Memory Network for Movie Story Understanding; International Conference on Computer Vision; Oct. 22-29, 2017; pp. 677-685.

Wang X., et al.; Videos as Space-Time Region Graphs.European Conference on Computer Vision; Oct. 6, 2018; pp. 413-431; Lecture Notes in Computer Science, vol. 11209. Springer, Cham. https://doi.org/10.1007/978-3-030-01228-1_25.

Alamri, Huda et al.; Audio Visual Scene-Aware Dialog; Cornell University Library; arXiv:1901.09107v2; May 8, 2019; 15 pages.

Chao, Guan-Lin et al.; Learning Question-Guided Video Representation For Multi-Turn Video Question Answering; Cornell University Library; arXiv:1907.13280.v1; Jul. 31, 2019; 11 pages.

Hori, C. et al.; End-To-End Audio Visual Scene-Aware Dialog Using Multimodal Attention-Based Video Features; 2019 IEEE International Conference on Acoustics, Speech and Signal Processing (ICASSP); May 12-17, 2019; 6 pages.

Le, Thao Minh et al.; Learning To Reason With Relational Video Representation For Question Answering; Cornell University Library; arXiv:1907.04553v1; Jul. 10, 2019; 10 pages.

Zeng, Kuo-Hao et al.; Leveraging Video Descriptions To Learn Video Question Answering; Cornell University Library; arXiv:1611.04021v1; Nov. 12, 2016; 7 pages.

* cited by examiner

VIDEO RESPONSE GENERATION AND MODIFICATION

BACKGROUND

The present invention relates generally to a method for generating and modifying a video response and in particular to a method and associated system for improving software and video technology associated with parsing audio and video data from an audio/video file, executing an associated query, and generating a natural language response with respect to said natural language query and a node comprising similar features with respect to a parsed query entity.

SUMMARY

A first aspect of the invention provides a video response generation and modification method comprising: receiving, by a processor of a hardware device, an audio/video file; generating, by the processor, parsed video features of the audio/video file; generating by the processor, a first graph comprising the parsed video features; generating, by the processor, parsed audio features of the audio/video file; generating by the processor, a second graph comprising the parsed audio features; overlaying, by the processor, the first graph with respect to the second graph; determining, by the processor based on results of the overlaying, at least one intersection point between the first graph and the second graph; executing, by the processor, a natural language query with respect to the audio/video file; generating, by the processor based on results of the executing, at least one parsed query entity from the natural language query; analyzing, by the processor, the at least one parsed query entity with respect to the at least one intersection point; determining, by the processor, at least one node of the at least one intersection point comprising similar features with respect to the at least one parsed query entity; and generating, by the processor based on the at least one node, a natural language response with respect to the natural language query.

A second aspect of the invention provides a computer program product, comprising a computer readable hardware storage device storing a computer readable program code, the computer readable program code comprising an algorithm that when executed by a processor of hardware device implements a video response generation and modification method, the method comprising: receiving, by the processor, an audio/video file; generating, by the processor, parsed video features of the audio/video file; generating by the processor, a first graph comprising the parsed video features; generating, by the processor, parsed audio features of the audio/video file; generating by the processor, a second graph comprising the parsed audio features; overlaying, by the processor, the first graph with respect to the second graph; determining, by the processor based on results of the overlaying, at least one intersection point between the first graph and the second graph; executing, by the processor, a natural language query with respect to the audio/video file; generating, by the processor based on results of the executing, at least one parsed query entity from the natural language query; analyzing, by the processor, the at least one parsed query entity with respect to the at least one intersection point; determining, by the processor, at least one node of the at least one intersection point comprising similar features with respect to the at least one parsed query entity; and generating, by the processor based on the at least one node, a natural language response with respect to the natural language query.

A third aspect of the invention provides a hardware device comprising a processor coupled to a computer-readable memory unit, the memory unit comprising instructions that when executed by the processor implements a video response generation and modification method comprising: receiving, by the processor, an audio/video file; generating, by the processor, parsed video features of the audio/video file; generating by the processor, a first graph comprising the parsed video features; generating, by the processor, parsed audio features of the audio/video file; generating by the processor, a second graph comprising the parsed audio features; overlaying, by the processor, the first graph with respect to the second graph; determining, by the processor based on results of the overlaying, at least one intersection point between the first graph and the second graph; executing, by the processor, a natural language query with respect to the audio/video file; generating, by the processor based on results of the executing, at least one parsed query entity from the natural language query; analyzing, by the processor, the at least one parsed query entity with respect to the at least one intersection point; determining, by the processor, at least one node of the at least one intersection point comprising similar features with respect to the at least one parsed query entity; and generating, by the processor based on the at least one node, a natural language response with respect to the natural language query.

The present invention advantageously provides a simple method and associated system capable of accurately generating and modifying a video response to an audio/video signal.

DETAILED DESCRIPTION

Figure 1:
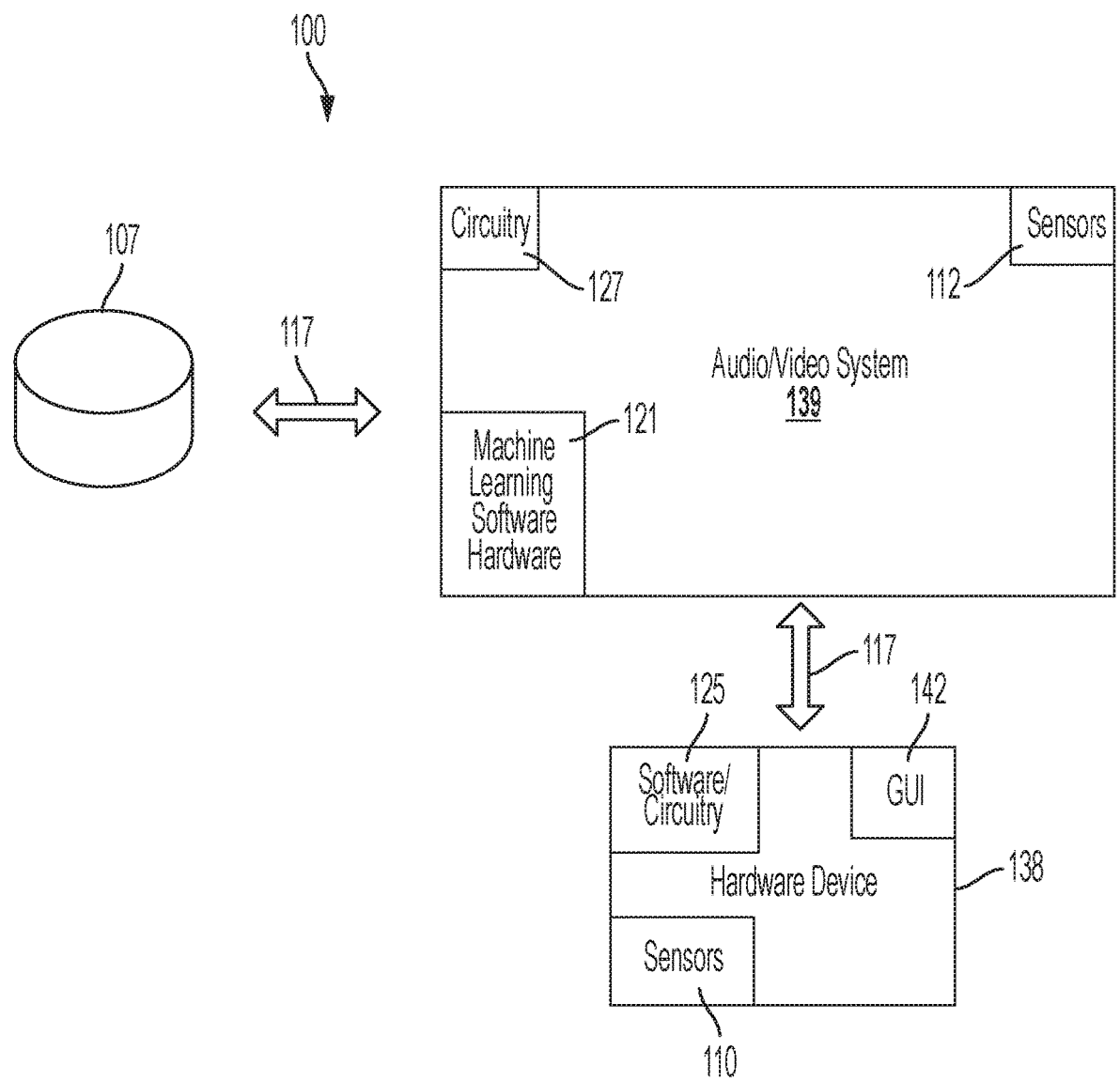
FIG. 1 illustrates a system for improving software and video technology associated with parsing audio and video data from an audio/video file, executing an associated query, and generating a natural language response with respect to said natural language query and a node comprising similar features with respect to a parsed query entity, in accordance with embodiments of the present invention.

FIG. 1 illustrates a system 100 for improving software and video technology associated with parsing audio and video data from an audio/video file, executing an associated query, and generating a natural language response with respect to said natural language query and a node comprising similar features with respect to a parsed query entity, in accordance with embodiments of the present invention. System 100 addresses issues associated with a typical video question answering process comprising a system for answering a question with respect to content of a given video. Typical video question answering processes comprise: extracting video features and question features respectively; fusing the video features and question features with respect to specified modalities; using a fully-connected layer comprising a software operation to obtain an answer. Additionally, during a typical video question answering process, a relationship between input video and a question is not sufficiently determined thereby limiting the process to single vector representations that are not capable of analyzing complex structures within a compound language expression of a video file during a specified scenario. System 100 is configured to detect a relationship type between a question and a video with respect to a digital model for boosting system performance. Therefore, system 100 is enabled to generate and modify a video response by modeling the relationships between video objects using a graph.

System 100 enables a video question graph convolutional network (VQ-GCN) for generating a response to a video question answering process. System 100 is configured to execute code for modeling a relationship between a visual feature (e.g., a mirror on an automobile) from a video frame of a video stream or video file and a language feature (e.g., a vector for a question) from a question related to the video frame. Additionally, system 100 is configured to execute code for modeling a relationship between objects (e.g., an automobile in a video frame) within the video stream or video file to boost the performance of video a question answering process. The relationships between objects within the video stream or video file are modeled via usage of graphing software such that (digital) nodes are generated between an integration an object feature and a question feature. Likewise, edges (between nodes) are generated with respect to according relationships between the objects. System 100 is configured to capture the specified information between objects and an interaction between a video stream or video file and a question. System 100 comprises a framework for modeling a relationship between the visual feature and the language feature with respect to a process for video question answering. The framework enables a language feature to interact with visual feature at the reasoning sage (e.g., a graph convolution stage) thereby differing from alternative methods that fuse a video feature at a final stage.

System 100 of FIG. 1 includes an audio/video system 139 (i.e., specialized hardware device), a hardware device 138, and a database 107 (e.g., a cloud-based system) interconnected through a network 117. Audio/video system 139 includes specialized circuitry 127 (that may include specialized software), sensors 112, and machine-learning software code/hardware structure 121 (i.e., including machine-learning software code). Hardware device 138 may include, inter alia, a smart phone, a tablet computer, a computing device, etc. Hardware device 138 may be personal area network (WPAN, continuously changing a frequency) enabled to provide connectivity to each other and any type of system. Hardware device 138 includes specialized circuitry 125 (that may include specialized software), sensors 110, and a GUI 142. Sensors 110 and 112 may include any type of internal or external sensor (or biometric sensor) including, inter alia, ultrasonic three-dimensional sensor modules, an optical sensor, a video retrieval device, an audio retrieval device, humidity sensors, voltage sensors, a keyboard, a mouse, a touch screen, etc. Audio/video system 139 and hardware device 138 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, audio/video system 139 and hardware device 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software technology associated with improving software and video technology associated with parsing audio and video data from an audio/video file, executing an associated query, and generating a natural language response with respect to said natural language query and a node comprising similar features with respect to a parsed query entity. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables the following process for automatically generating an answer to a question with respect to a natural language query related to an audio/video file:

The process is initiated when a hardware device receives an audiovisual file for presentation. In response, video objects are extracted from the audiovisual file, video features are parsed from the video objects, and a graph of the parsed video features is generated. Additionally, audio objects are extracted from the from the audiovisual file, audio features are parsed from the audio objects, and a graph of the parsed audio features is generated. In response, intersections between the graph of the parsed video features and the graph of parsed audio features are determined. Likewise, a natural language query related to the audiovisual file is executed and query entities are parsed from the natural language query. The intersections are traversed to locate nodes having a greatest similarity to the entities parsed from the natural language query. Subsequently, a natural language response to the natural language query is generated using the nodes having a greatest similarity to the entities parsed from the natural language query.

Figure 2:
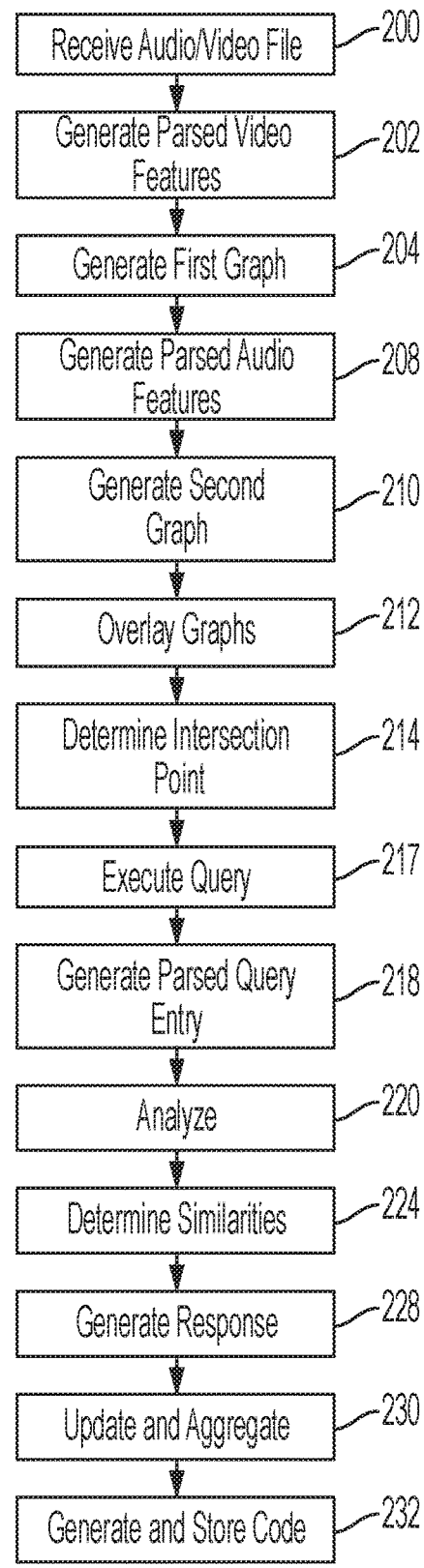
FIG. 2 illustrates an algorithm detailing a process flow enabled by the system of FIG. 1 for improving software and video technology associated with parsing audio and video data from an audio/video file, executing an associated query, and generating a natural language response with respect to said natural language query and a node comprising similar features with respect to a parsed query entity, in accordance with embodiments of the present invention.

FIG. 2 illustrates an algorithm detailing a process flow enabled by system 100 of FIG. 1 for improving software and video technology associated with parsing audio and video data from an audio/video file, executing an associated query, and generating a natural language response with respect to said natural language query and a node comprising similar features with respect to a parsed query entity, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by audio/video system 139 and hardware device. In step 200, an audio/video file is received by a hardware device. In step 202, parsed video features of the audio/video file are generated. Generating the parsed video features may include extracting video objects from the audio/video file and parsing the video features from the video objects. Extracting the video objects may include executing a visual feature encoder for encoding the audio/video file.

In step 204, a first graph comprising the parsed video features is generated. In step 208, parsed audio features of the audio/video file are generated. Generating the parsed audio features may include extracting audio objects from the audio/video file and parsing the audio features from the audio objects. Extracting the audio objects may include executing an audio feature encoder for encoding the audio/video file.

In step 210, a second graph comprising the parsed audio features is generated. In step 212, the first graph is virtually placed overlaying the second graph. In step 214, at least one intersection point between the first graph and the second graph is determined based on results of step 212. In step 217, a natural language query is executed with respect to the audio/video file. In step 218, at least one parsed query entity is generated from the natural language query. In step 220, the at least one parsed query entity is analyzed with respect to the at least one intersection point. In step 224, at least one node of the at least one intersection point comprising similar features with respect to the at least one parsed query entity is determined. In step 228, a natural language response with respect to the natural language query is generated based on the at least one node. The natural language response may include an automated answer to a question associated with the audio/video file.

In step 230, edge features of the at least one node are updated and the at least one mode is aggregated with a plurality of additional nodes comprising the similar features. The automated answer may be further generated based on results of the aggregation. In step 232, machine learning software code is generated and stored within a modified portion of a memory structure. The machine learning software code is configured for executing future processes associated with executing a video response generation and modification method.

Figure 3:
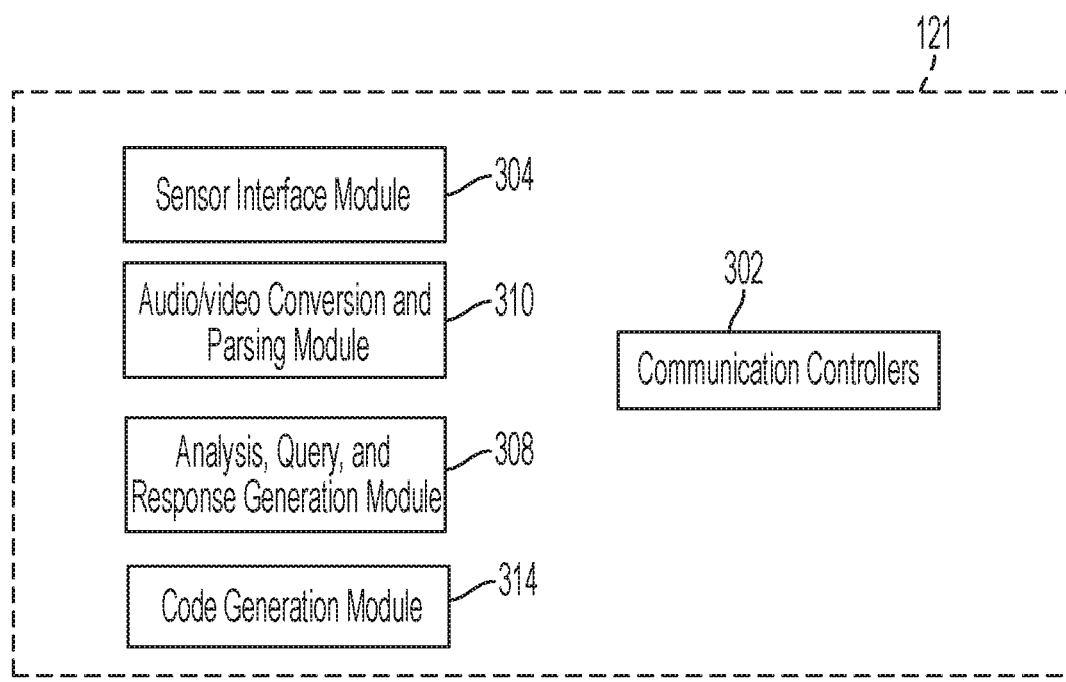
FIG. 3 illustrates an internal structural view of the machine learning software/hardware structure of FIG. 1, in accordance with embodiments of the present invention.

FIG. 3 illustrates an internal structural view of machine learning software/hardware structure 121 (and/or circuitry 127 or 125), in accordance with embodiments of the present invention. Machine learning software/hardware structure 121 includes a sensor interface module 304, an audio/video conversion and parsing module 310, an analysis, query, and response generation module 308, a code generation module 314, and communication controllers 302. Sensor interface module 304 comprises specialized hardware and software for controlling all functions related to sensors 110 or 112 of FIG. 1. Audio/video conversion and parsing module 310 comprises specialized hardware and software for controlling all functionality related to control of all audio/video conversion and parsing processes for implementing the process described with respect to the algorithm of FIG. 2. Analysis, query, and response generation module 308 comprises specialized hardware and software for controlling all functions related to the analysis, query, and response generation steps of FIG. 2. Code generation module 314 comprises specialized hardware and software for controlling all functions related to generating machine learning feedback for generating machine learning software code for executing future video response generation and modification processes. Communication controllers 302 are enabled for controlling all communications between sensor interface module 304, audio/video conversion and parsing module 310, analysis, query, and response generation module 308, and code generation module 314.

Figure 4:
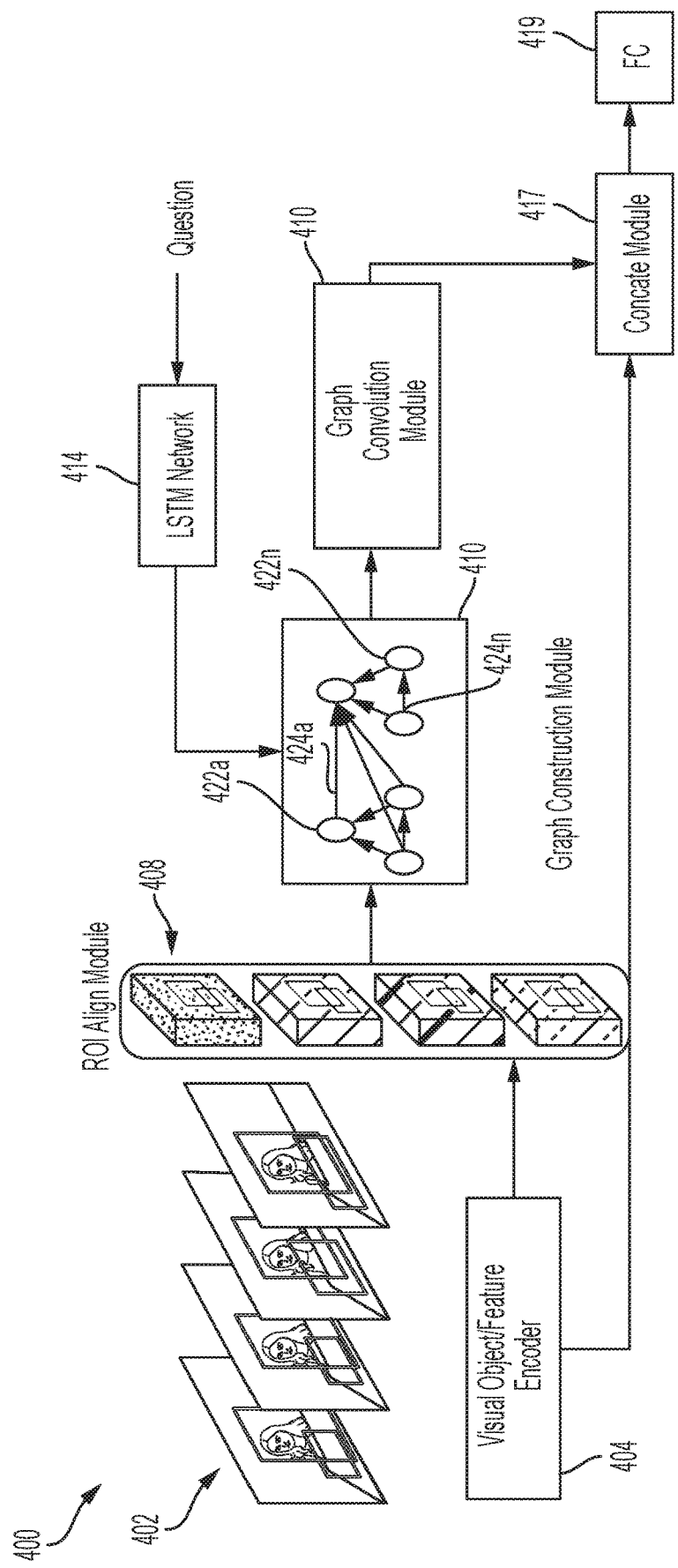
FIG. 4 illustrates a system 400 associated with modeling relationships between video objects and features via usage of graphing software, in accordance with embodiments of the present invention.

FIG. 4 illustrates a system 400 associated with modeling relationships between video objects and features via usage of graphing software, in accordance with embodiments of the present invention. System 400 includes an audio/video file 402, a region of interest (ROI) module 408, a visual object/feature encoder module 404, a graph construction module 410, a long term short term memory (LSTM) network, a graph convolution module 412, a concate (linking) module 417, and a fiber channel (FC). Audio/video file 402 is inputted ROI module 408 for enabling an encoding process executed by visual object/feature encoder module 404. The encoded information is inputted into graph construction modules for graph construction and graph convolution resulting in generation of a natural language response to a natural language query. System 100 enables graph networks for modeling a relationship between audio and video objects and initial questions. Nodes 422a . . . 422n are generated as an integration between an (audio or video) object feature and a question feature. Edges 424a . . . 424n (between nodes 422a . . . 422n) are generated with respect to relationships between the objects. Graph convolution module 412 is configured to execute a graph convolution process for capturing object interactions between objects within audio/video file 402 and inputted questions. System 100 enables the following features:

1. Execution of a convolutional neural network (CNN) network for detecting objects in videos. A CNN network comprises a deep neural networks for analyzing visual imagery 2. Execution of LSTM network 414 for encoding questions. LSTM network 414 comprises artificial recurrent neural network (RNN) architecture for enabling a deep learning process.

3. Graph construction between objects and questions.

4. Execution of a graphical convolution process for to capturing object interactions within videos and questions and outputting an associated answer.

Figure 5:
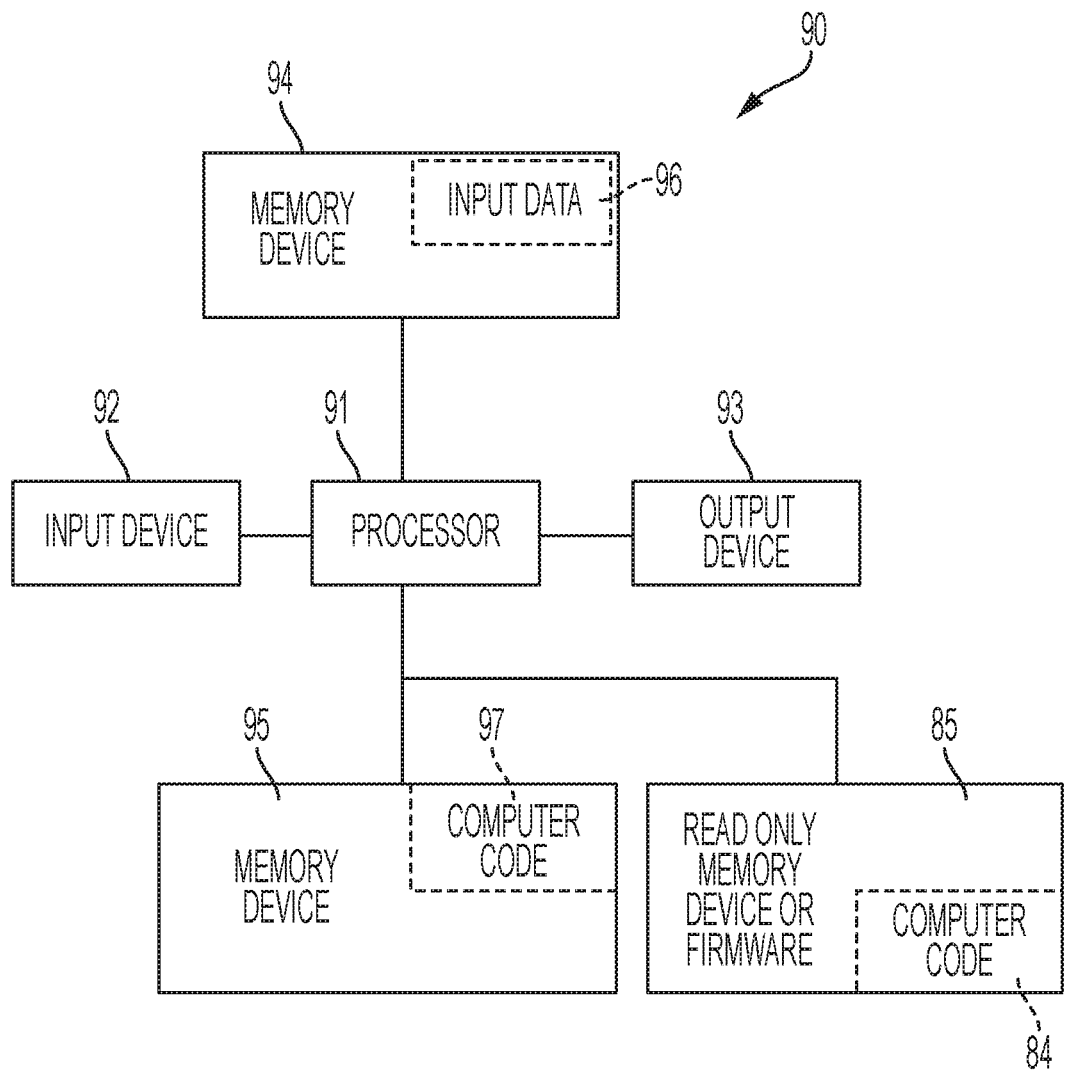
FIG. 5 illustrates a computer system used by the system of FIG. 1 for improving software and video technology associated with parsing audio and video data from an audio/video file, executing an associated query, and generating a natural language response with respect to said natural language query and a node comprising similar features with respect to a parsed query entity, in accordance with embodiments of the present invention.

FIG. 5 illustrates a computer system 90 (e.g., audio/video system 139 and/or hardware device 138 of FIG. 1) used by or comprised by the system of FIG. 1 for improving software and video technology associated with parsing audio and video data from an audio/video file, executing an associated query, and generating a natural language response with respect to said natural language query and a node comprising similar features with respect to a parsed query entity, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software and video technology associated with parsing audio and video data from an audio/video file, executing an associated query, and generating a natural language response with respect to said natural language query and a node comprising similar features with respect to a parsed query entity. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software and video technology associated with parsing audio and video data from an audio/video file, executing an associated query, and generating a natural language response with respect to said natural language query and a node comprising similar features with respect to a parsed query entity. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software and video technology associated with parsing audio and video data from an audio/video file, executing an associated query, and generating a natural language response with respect to said natural language query and a node comprising similar features with respect to a parsed query entity. In another embodiment, the invention provides a business method that performs the process steps of the invention on a subscription, advertising, and/or fee basis. That is, a service supplier, such as a Solution Integrator, could offer to enable a process for improving software and video technology associated with parsing audio and video data from an audio/video file, executing an associated query, and generating a natural language response with respect to said natural language query and a node comprising similar features with respect to a parsed query entity. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a configuration of hardware and software, any configuration of hardware and software, as would be known to a person of ordinary skill in the art, may be utilized for the purposes stated supra in conjunction with the computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
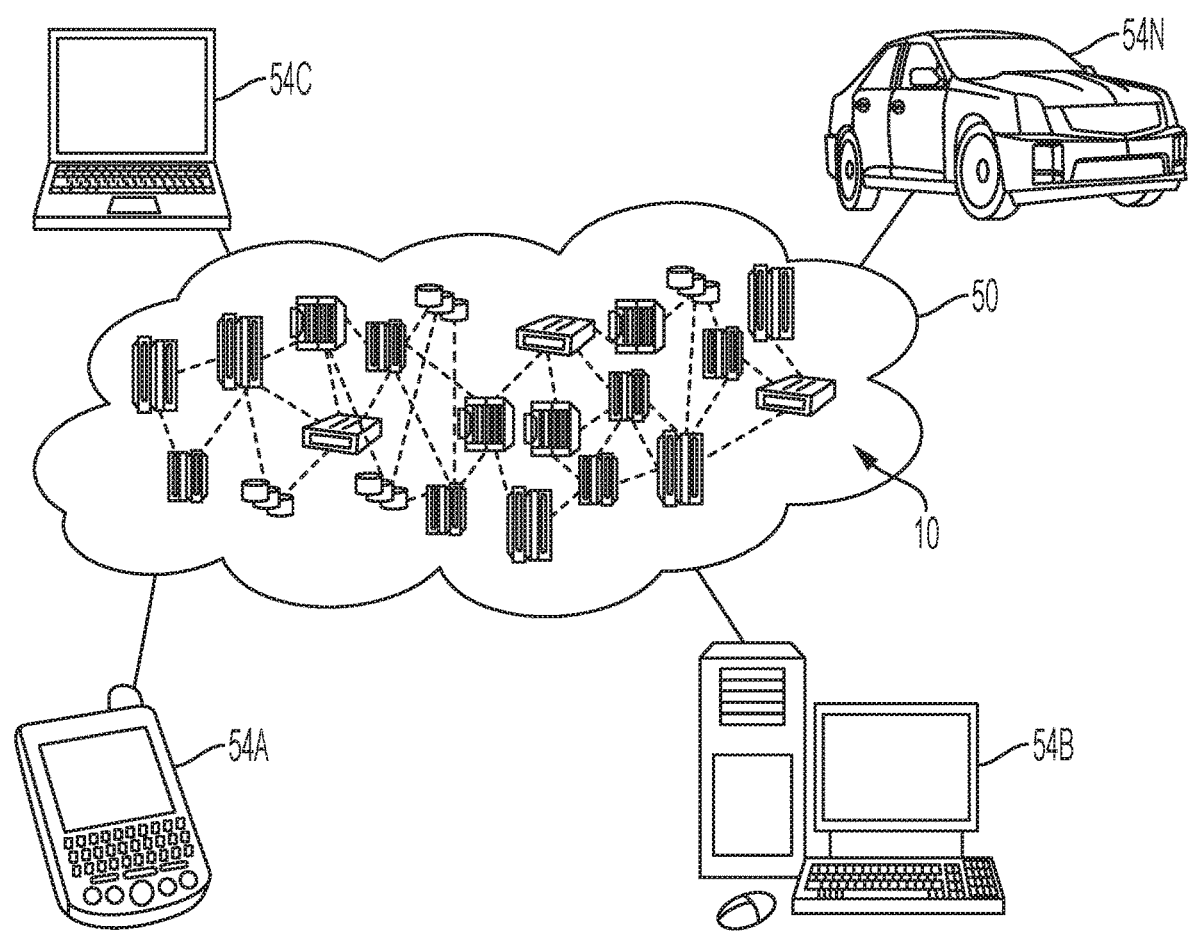
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
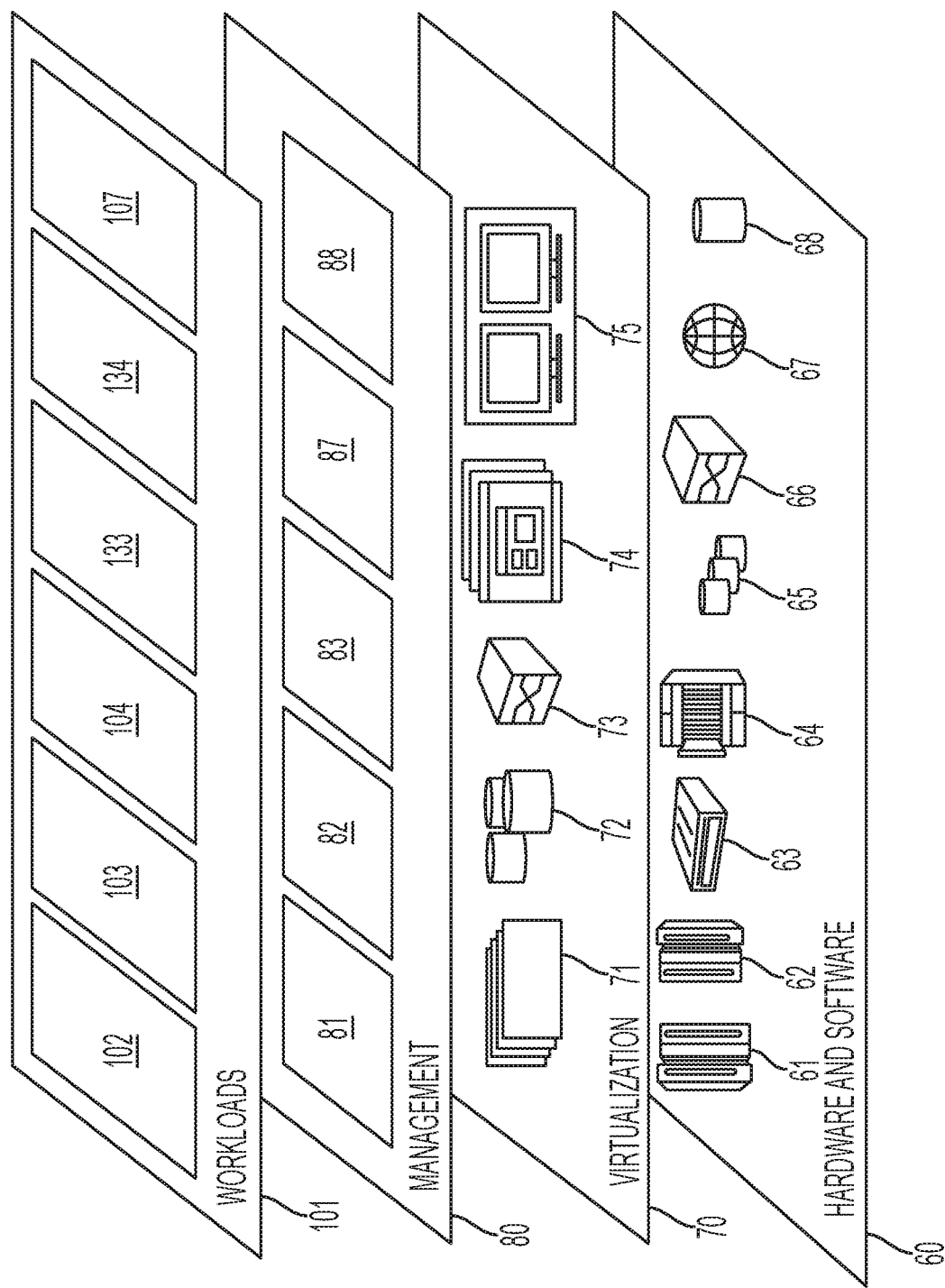
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and improving software and video technology associated with parsing audio and video data from an audio/video file, executing an associated query, and generating a natural language response with respect to said natural language query and a node comprising similar features with respect to a parsed query entity 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A video response generation and modification method comprising:
    receiving, by a processor of a hardware device, an audio/video file;
    generating, by said processor, parsed video features of said audio/video file;
    generating by said processor, a first graph comprising said parsed video features;
    generating, by said processor, parsed audio features of said audio/video file;
    generating by said processor, a second graph comprising said parsed audio features;
    overlaying, by said processor, said first graph with respect to said second graph;
    determining, by said processor based on results of said overlaying, at least one intersection point between said first graph and said second graph;
    executing, by said processor, a natural language query with respect to said audio/video file;
    generating, by said processor based on results of said executing, at least one parsed query entity from said natural language query;
    analyzing, by said processor, said at least one parsed query entity with respect to said at least one intersection point;
    determining, by said processor, at least one node of said at least one intersection point comprising similar features with respect to said at least one parsed query entity; and
    generating, by said processor based on said at least one node, a natural language response with respect to said natural language query.

2. The method of claim 1, wherein said generating said parsed video features comprises:
    extracting, by said processor, video objects from said audio/video file; and
    parsing, by said processor, said video features from said video objects.

3. The method of claim 2, wherein said extracting said video objects comprises executing a visual feature encoder for encoding said audio/video file.

4. The method of claim 1, wherein said generating said parsed audio features comprises:
    extracting, by said processor, audio objects from said audio/video file; and
    parsing, by said processor, said audio features from said audio objects.

5. The method of claim 4, wherein said extracting said audio objects comprises executing an audio feature encoder for encoding said audio/video file.

6. The method of claim 1, wherein said natural language response comprises an automated answer to a question associated with said audio/video file.

7. The method of claim 1, further comprising:
    updating, by said processor, edge features of said at least one node; and
    aggregating, by said processor, said at least one mode with a plurality of additional nodes comprising said similar features, wherein said automated answer is generated based on results of said aggregating.

8. The method of claim 1, further comprising:
    generating, by said processor, machine learning software code for executing future processes associated with executing said video response generation and modification method; and
    storing, by said processor, said machine learning software code within a modified portion of a memory structure of said hardware device.

9. The method of claim 1, further comprising:
    providing at least one support service for at least one of creating, integrating, hosting, maintaining, and deploying computer-readable code in the control hardware, said code being executed by the computer processor to implement: said receiving, said generating said parsed video entries, said generating said first graph, said generating said parse audio entries, said generating said second graph, said overlaying, said determining, said executing, said generating said at least one parsed query, said analyzing, said determining said at least one node, and said generating said natural language response.

10. A computer program product, comprising a computer readable hardware storage device storing a computer readable program code, said computer readable program code comprising an algorithm that when executed by a processor of hardware device implements a video response generation and modification method, said method comprising:
    receiving, by said processor, an audio/video file;
    generating, by said processor, parsed video features of said audio/video file;
    generating by said processor, a first graph comprising said parsed video features;
    generating, by said processor, parsed audio features of said audio/video file;
    generating by said processor, a second graph comprising said parsed audio features;
    overlaying, by said processor, said first graph with respect to said second graph;
    determining, by said processor based on results of said overlaying, at least one intersection point between said first graph and said second graph;
    executing, by said processor, a natural language query with respect to said audio/video file;
    generating, by said processor based on results of said executing, at least one parsed query entity from said natural language query;
    analyzing, by said processor, said at least one parsed query entity with respect to said at least one intersection point;
    determining, by said processor, at least one node of said at least one intersection point comprising similar features with respect to said at least one parsed query entity; and
    generating, by said processor based on said at least one node, a natural language response with respect to said natural language query.

11. The computer program product of claim 10, wherein said generating said parsed video features comprises:
    extracting, by said processor, video objects from said audio/video file; and
    parsing, by said processor, said video features from said video objects.

12. The computer program product of claim 11, wherein said extracting said video objects comprises executing a visual feature encoder for encoding said audio/video file.

13. The computer program product of claim 10, wherein said generating said parsed audio features comprises:
    extracting, by said processor, audio objects from said audio/video file; and
    parsing, by said processor, said audio features from said audio objects.

14. The computer program product of claim 13, wherein said extracting said audio objects comprises executing an audio feature encoder for encoding said audio/video file.

15. The computer program product of claim 10, wherein said natural language response comprises an automated answer to a question associated with said audio/video file.

16. The computer program product of claim 10, wherein said method further comprises:
   updating, by said processor, edge features of said at least one node; and
   aggregating, by said processor, said at least one mode with a plurality of additional nodes comprising said similar features, wherein said automated answer is generated based on results of said aggregating.

17. The computer program product of claim 10, wherein said method further comprises:
   generating, by said processor, machine learning software code for executing future processes associated with executing said video response generation and modification method; and
   storing, by said processor, said machine learning software code within a modified portion of a memory structure of said hardware device.

18. A hardware device comprising a processor coupled to a computer-readable memory unit, said memory unit comprising instructions that when executed by the processor implements a video response generation and modification method comprising:
   receiving, by said processor, an audio/video file;
   generating, by said processor, parsed video features of said audio/video file;
   generating by said processor, a first graph comprising said parsed video features;
   generating, by said processor, parsed audio features of said audio/video file;
   generating by said processor, a second graph comprising said parsed audio features;
   overlaying, by said processor, said first graph with respect to said second graph;
   determining, by said processor based on results of said overlaying, at least one intersection point between said first graph and said second graph;
   executing, by said processor, a natural language query with respect to said audio/video file;
   generating, by said processor based on results of said executing, at least one parsed query entity from said natural language query;
   analyzing, by said processor, said at least one parsed query entity with respect to said at least one intersection point;
   determining, by said processor, at least one node of said at least one intersection point comprising similar features with respect to said at least one parsed query entity; and
   generating, by said processor based on said at least one node, a natural language response with respect to said natural language query.

19. The hardware device of claim 18, wherein said generating said parsed video features comprises:
   extracting, by said processor, video objects from said audio/video file; and
   parsing, by said processor, said video features from said video objects.

20. The hardware device of claim 19, wherein said extracting said video objects comprises executing a visual feature encoder for encoding said audio/video file.

\* \* \* \* \*